United States Patent [19]

Jeffries

[11] Patent Number: 5,460,251
[45] Date of Patent: Oct. 24, 1995

[54] ADJUSTABLE SPEED GAS SPRING

[75] Inventor: Mark S. Jeffries, Florence, S.C.

[73] Assignee: AVM, Inc., Mation, S.C.

[21] Appl. No.: 305,205

[22] Filed: Sep. 13, 1994

[51] Int. Cl.⁶ ........................................................ F16F 9/50
[52] U.S. Cl. ..................... 188/282; 188/319; 188/322.15; 267/64.11
[58] Field of Search ..................... 188/281, 282, 188/279, 322.15, 317, 319; 267/64.11, 64.25

[56] References Cited

U.S. PATENT DOCUMENTS 4,438,833  3/1984  Schafer .......................... 188/322.15 X
4,467,899  8/1984  Molders et al. ............... 188/322.15 X
4,796,871  1/1989  Bauer et al. ........................ 188/282 X

FOREIGN PATENT DOCUMENTS 0198180  10/1986  European Pat. Off. .......... 188/188.15

Primary Examiner—Robert J. Oberleitner
Assistant Examiner—Lee W. Young
Attorney, Agent, or Firm—McAndrews, Held & Malloy, Ltd.

[57] ABSTRACT

An adjustable speed gas spring primarily adapted for use has a part of a door closing mechanism. The gas spring includes a piston assembly which is disposed within an elongated fluid chamber and which upon relative rotation of the shaft with respect to the tubular body, permits the user to adjust the shaft extension velocity. The gas spring is fully functional in any shaft orientation.

15 Claims, 2 Drawing Sheets

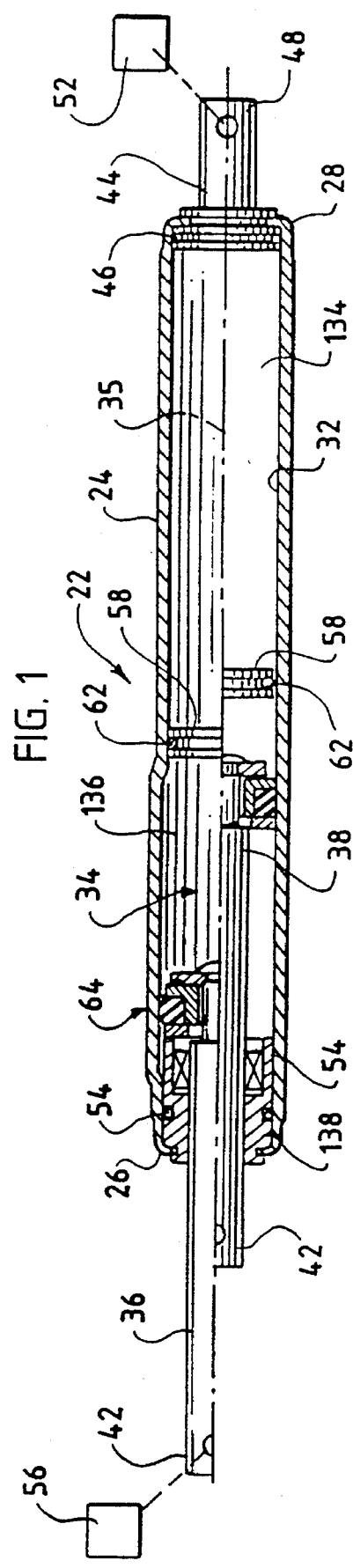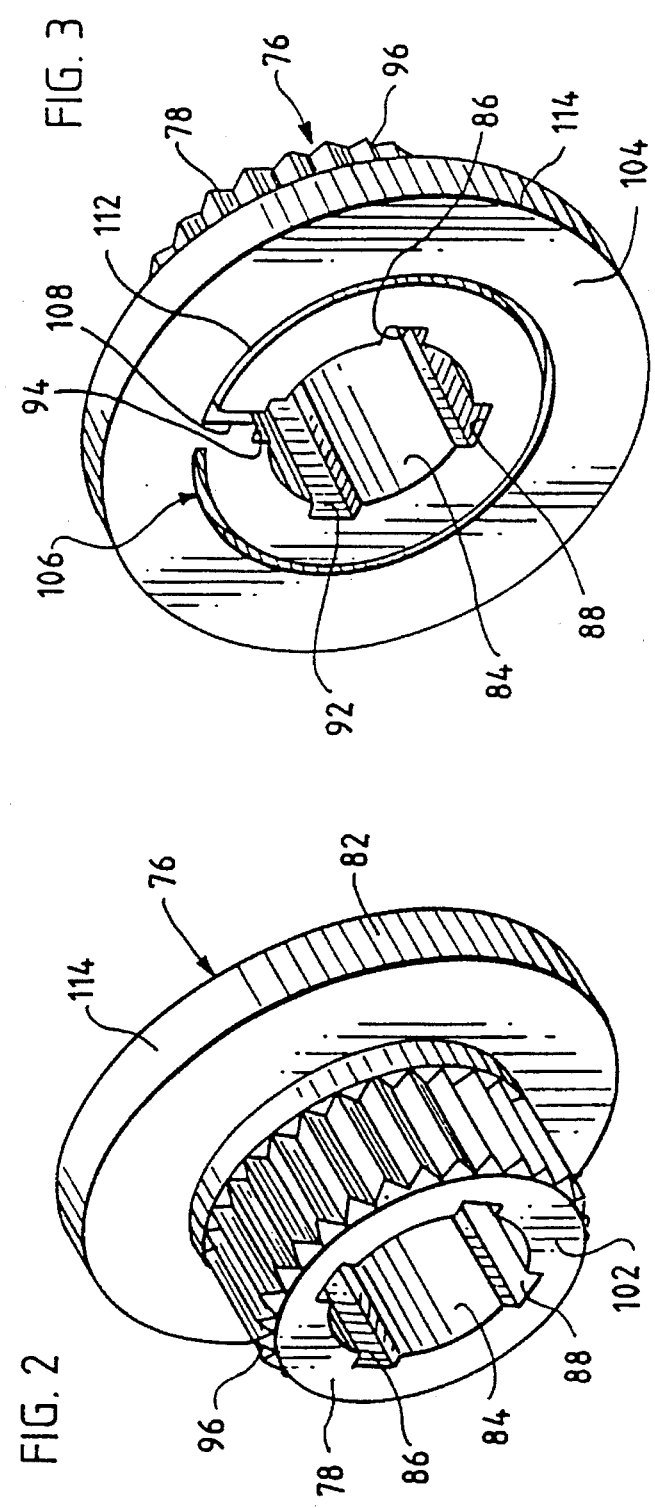

ADJUSTABLE SPEED GAS SPRING

BACKGROUND OF THE INVENTION

The present invention relates to gas springs, and more particularly, to adjustable or variable speed gas springs that have an adjustable extension velocity and that are particularly suited for use as a part of a door closure mechanism where the spring extension velocity determines the closing speed of the door.

In the past, adjustable speed springs of various constructions have been used for a variety of purposes including serving as parts of door closure mechanisms. The adjustment of the shaft extension velocity or speed of springs, which are used as parts of door closing mechanisms, has been achieved by rotating the spring shaft relative to its tubular body or "tube". Those working in this art have long sought to develop springs whose shaft extension speed can be readily and easily adjusted while minimizing the cost of manufacturing the spring. Additionally, a further goal of those working in this art has been to develop an adjustable speed gas spring that will stand up to the forces imposed upon the spring during its usage such as when it is used as a part of a door closure mechanism, that can achieve a full range of speed adjustments within one revolution of the spring shaft relative to its tubular body, and that will be fully functional regardless of the particular orientation of the spring in its use environment.

SUMMARY OF THE INVENTION

In principal aspects, the improved variable speed gas spring of the present invention achieves the aforementioned goals of those working in the art. At a nominal output force of about 80 pounds, the improved gas spring of the present invention can be adjusted so as to have a shaft extension velocity of between 1.5 inches per second to about 0.25 inches per second. In other words, this improved spring, having a 1.5 inch shaft extension stroke, can be adjusted so that full extension is achieves as fast as one second or as slow as six seconds.

Such full adjustment of the shaft extension velocity can be achieved by simply rotating the tubular body of the gas spring relatively about the axis of its shaft through less than one complete revolution and does not require the employment of any threaded parts in the springs piston assembly which obviously reduces the spring's manufacturing costs. Additionally, the improved adjustable speed gas spring of the present invention may employ a relatively inexpensive means for assuring that the spring's piston assembly remains properly aligned within the tubular body so as to assure that the spring may be repeatedly and predictably adjusted to the same shaft extension velocities in a user friendly manner.

The improved gas spring of the present invention also fully functions in any orientation, (e.g., shaft up, shaft down, shaft horizontal, etc.). It includes structure that permits the gas spring to readily and easily be initially charged and its piston valve assembly may be self-cleaning— a significant benefit in hydraulic and/or pneumatic mechanisms. The manufacturing costs of the improved spring are further reduced by a design that allows for the use of a self-retaining shaft front end bushing and self-retaining end cap for the other end of the spring.

Accordingly, it is a principal object of the present invention to provide an improved adjustable speed gas spring as described above, whose shaft extension velocity may be readily, easily and predictable adjusted, time and time again, by rotating the spring shaft and tubular body relatively to each other. A related object of the present invention is to provide an improved adjustable speed gas spring of the type described where the full range of adjustments can be achieved within less than one complete relative revolution of the shaft and tubular body; and where the spring can be manufactured at a relatively low cost.

A further object of the present invention is to provide an improved adjustable speed gas spring of the type described which is particularly adapted for assisting in the opening and closing a door in a building; where the gas spring's tubular body includes an inner wall that defines an elongated fluid chamber which has first and second normally closed ends, which has an elongated axis that extends between its ends, and which is filled with at least one pressurized fluid; where the first end of the spring's shaft extends into the first end of the fluid chamber so than the axis of the fluid chamber and the shaft are co-axial; where a novel first piston assembly is supported on and about the shaft, adjacent the first end of the shaft, and serves to divide or separate the fluid chamber into a shaft-side sub-chamber and a middle sub-chamber; where the first piston assembly includes a sub-assembly that has a first and second sides, with the first side facing the first end of the fluid chamber and with the second side facing the second end of the fluid chamber, and that has a portion which sealingly engages the inner wall of the tubular body so as to prevent flow of fluid between the sub-assembly and the inner wall; where the first piston assembly also includes a first member that is connected with the first end of the shaft so as to move therewith and that has a first side which faces the second side of the sub-assembly and which, in cooperation with the second side of the sub-assembly, serves to block the flow of pressurized fluid through a first flow path defined in and through the first piston assembly, between the shaft-side and middle sub-chambers, when the shaft and piston assembly are being moved in a shaft extension direction; where flow is permitted through the first flow path when the shaft and first piston assembly are moved in a shaft retraction direction; and where flow is permitted through a second flow path which is defined in and through the piston assembly between the shaft-side and middle sub-chambers, and, which permits a smaller volume of fluid to pass therethrough, per unit time, than the first flow path, when the shaft and first piston assembly are moved in a shaft extension direction, with a part of the second flow path being defined between the facing sides of the sub-assembly and the first member. A related object of the present invention is to provide an improved gas spring of the type described where the part of the second flow path (that is, the part extending between the facing sides of the sub-assembly and the first member) includes a groove that has a portion extending through an arc about the shaft and substantially around the periphery of the second side of the sub-assembly; and where the first side of the first member includes a cut-out that extends from the peripheral side edge of the first member, radially inwardly such that when the second side of the sub-assembly and the first side of the first member are in surface-to-surface contact, the cut-out overlaps with the portion of the groove.

A still further object of the present invention is to provide an improved adjustable speed gas spring of the type described where a second or "floating" piston assembly is disposed in and is axially movable within the fluid chamber between the first piston assembly and the second end of the chamber; where the second piston assembly serves to define an end of the middle sub-chamber, which is between the two piston assemblies, and an end sub-chamber which is between the second piston assembly and the second end of the fluid chamber; where the end sub-chamber is filled with a second pressurized fluid, such as a gas, that is selectively pressurized to a predetermined pressure; where the second piston assembly includes a seal between it and the inner wall of the tubular body for preventing flow of the pressurized fluid therebetween; and where the axial position of the second piston assembly in the fluid chamber is determined by the pressure of the second pressurized fluid in the end sub-chamber and the axial position of the second piston assembly determines the pressure of the pressurized fluid in the shaft-end and middle sub-chambers and thus the fluid pressure acting on the first end of the shaft.

These and other objects, advantages and benefits of the present invention will become apparent to those skilled in the art from the following description of the drawings and the preferred embodiment of the present invention.

DESCRIPTION OF THE DRAWINGS

FIG. 1 is a vertical cross-sectional view of the preferred embodiment of the adjustable speed gas spring of the present invention, with the shaft and piston assemblies being shown, in the upper half of this FIGURE, in a shaft extended position, and with the shaft and piston assemblies being shown in the lower half of the FIGURE, in a shaft retracted position;

FIG. 2 is a perspective view showing one side of a metering plate that is a component of a first piston assembly of the present invention;

FIG. 3 is another perspective view of the metering plate of FIG. 2 and showing the other side of the metering plate;

DETAILED DESCRIPTION OF THE PREFERRED EMBODIMENT

Figure 4:
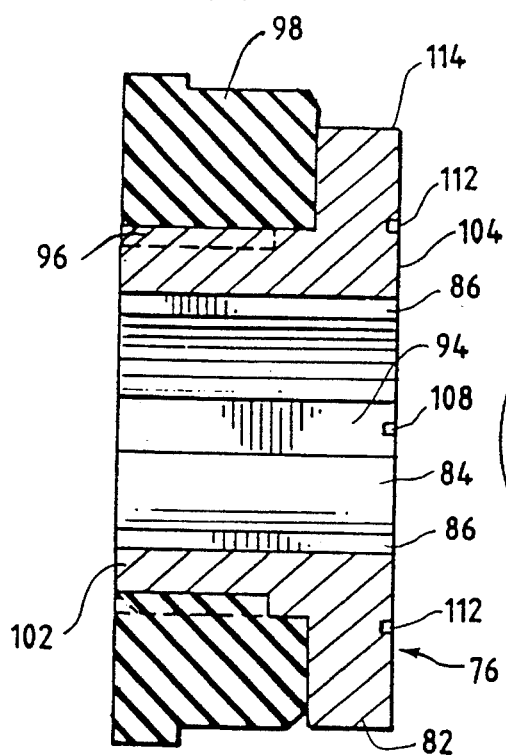
FIG. 4 is an axial, vertical cross-section of the metering plate shown in FIGS. 2 and 3, and a piston seal that is mounted on the metering plate.

Referring now to FIG. 1, a preferred embodiment of the improved adjustable speed gas spring of the present invention is shown generally at 22. It includes a tubular body 24 that has a first end 26, a second end 28, and a generally tubular inner wall 32. The latter serves to define an elongated fluid chamber 34 that extends between the ends 26 and 28 and that has a central longitudinal axis, shown generally at 35, extending between the ends.

The spring 22 also includes a machined shaft 36 having a first end 38 and a second end 42. The first end of the shaft is disposed within the fluid chamber 34 and is adapted to move reciprocally therein between a shaft extended position, shown on the upper half of FIG. 1, and a shaft retracted position, shown in the lower half of FIG. 1. The shaft has a central longitudinal axis which is coaxial with the longitudinal axis 35 of the fluid chamber 34.

The end 28 of the tubular body is closed by a conventional, self-retaining endcap 44. A conventional O-ring seal 46 is carried by the endcap 44 and serves to form a fluid tight seal between the endcap and the end 28. The projecting end 48 of the endcap 44 is adapted to be connected in a conventional manner with, for example, a building, diagrammatically shown at 52, when the spring 22 is used as a part of an otherwise conventional door closure mechanism.

A conventional, self-retaining front bushing 54 extends about the shaft, adjacent the end 26 of the tubular body 24. It forms a fluid tight seal around the outer periphery of the shaft 36 as it reciprocally moves within the tubular body 24.

The end 42 of the shaft 36 may be connected in a conventional manner with, for example, a door, shown diagrammatically at 56, when the gas spring 22 is used as a component of the door closure mechanism.

A floating piston assembly 58 is disposed in the fluid chamber 34 between the end cap 44 and the end 38 of the shaft 34. This assembly 58 includes a conventional O-ring seal 62 that serves to form a fluid tight seal between the outer periphery of the piston assembly 58 and the inner wall 32 of the tubular body 24. The floating piston assembly 58 may move within the fluid chamber 34 along and parallel to the axis 35 of that chamber in response to the differential fluid pressure acting on the assembly 58 as hereinafter more specifically described.

Referring now to FIGS. 1, 4, 7 and 8, a piston assembly 64 is supported on the shaft 36 adjacent no its end 38. More particularly, a shoulder 66 is formed adjacent the end 38, and the assembly 64 is disposed between the reduced diameter portion 68 between this shoulder and the distal end 38 of the shaft.

The assembly 64 comprises a conventional "floating" washer 72 that includes a central aperture 74 through which the reduced diameter portion 68 of the shaft 36 extends. The aperture 74 is sized and shaped such that fluid may readily flow through it and between the washer 72 and the shoulder 66 but such that the washer 72 cannot pass beyond or ovens the shoulder 66, that is, to the left of the shoulder as shown in FIG. 1. The outer diameter of the washer 72 is substantially the same as but less than the diameter of inner wall 32 so that the washer can move axially, along with the shaft, without contacting the inner wall.

As best illustrated in FIGS. 2–4, a metering plate 76 is supported on the reduced diameter portion 68 of the shaft 36 adjacent to the floating washer 72. The metering plate 76 includes a reduced diameter portion 78 and a larger diameter portion 82. The metering plate 76 also has a central, axial opening 84 extending therethrough the diameter of the opening 84 is substantially the same but slightly larger than the diameter of the portion 68 of the shaft 36 so that the plate 76 can move along and relative to the portion 68. The opening includes four axial, radially outwardly extending, internal flow channels or passages 86, 88, 92 and 94. These passages 86–94 are equi-spaced about the longitudinal or axial axis of the opening 84 and permit fluid to freely pass through the plate as hereinafter more specifically described.

The radially outwardly facing surface of the reduced diameter portion 78 of the metering plate 76 includes a plurality of axially extending ribs or grooves 96. These grooves 96 cooperate with a conventional, annular piston seal 98, shown in FIGS. 4, 7 and 8, so that a fluid tight seal will be provided between that surface of the portion 78 and the annular seal 98. The inner diameter of the annular seal 98 is selected such that it tightly fits on the inner portion 78 of the metering plate 76 so that the seal 98 and the plate move together.

The radially outwardly facing surface of the annular seal 98 forms a fluid tight seal between that surface and the inner wall 32 of the tubular body 24. The outer diameter of the annular piston seal is selected such that it has an interference fit with the inner wall 32. This interference fit momentarily prevents or retards movement of the seal 98, and thus the metering plate 76, with the shaft 36 when the shaft initially begins to move within the chamber 34.

The motoring plate 76 further includes a first side 102 that is on the portion 78 and a second side 104 that is on the portion 82. These sides 102 and 104 are substantially parallel to each other and perpendicular to the axis of the shaft when the motoring plate is mounted on or supported by the shaft. Side 102 faces and is adjacent to the washer 72. It normally abuts the washer. Side 104 faces toward the end 28 of the tubular body 24 and the end 38 of the shaft 36.

Side 104 has a generally "G"-shaped groove 106 formed therein. A first portion 108 of the groove 106 is in fluid communication with and extends radially outwardly from the end of the passage 94 which is adjacent to the side 104. The groove 106 also includes a generally arc-like or semi-annular portion 112 that extends about the axis of the central opening 84 through an arc of slightly less than 360°. One end of the portion 112 intersects and is in fluid communication with the radially outward end of the portion 108, and its other end is spaced a short distance from the radially outward end of the portion 108. The portion 112 is disposed radially inwardly a pre-selected distance from the radially outer peripheral edge 114 of the side 104.

The piston assembly 64 also includes a top plate 116. It is attached to the end 38, that is, the distal end of the portion 68 of the shaft 36, by a rivet or similar fastener 118 such that the plate 116 cannot move, either axially or rotationally relative to the shaft 36.

Figure 5:
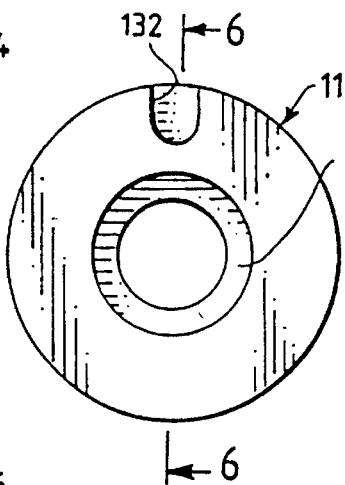
FIG. 5 is an end view of the top plate that is a component of the first piston assembly of the present invention.
Figure 6:
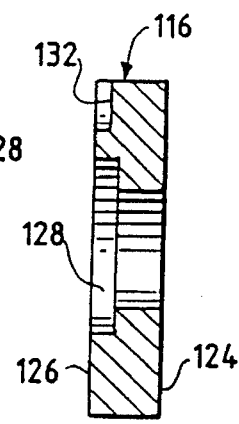
FIG. 6 is a cross-sectional view taken along the line 6—6 of FIG. 5.

As best shown in FIGS. 5 and 6, the top plate 116 has a first side 124 and a second side 126. Side 124 faces the end 28 of the tubular body 24 and is abutted by the head of the rivet 118. Side 126 faces and is substantially parallel to the side 104 of the plate 76. Side 126 includes a central cut-back portion 128 that surrounds a central aperture through which tile rivet 118 extends. Side 126 also includes a cut-out 132 that extends radially inwardly a pre-selected distance from the peripheral edge of the plate 116. The circumferential "width" of the cut-out 132 is relatively short and the radial length of the cut-out is selected, as described below, to permit its radially inner end to overlie the groove portion 112.

The axial length of the metering plate 76, including its seal 98, is selected such that this length is slightly less than the distance between the floating washer 72 and the side 126 of the top plate 116. Thus the sides 104 of the plate 76 and the side 126 of the plate 116 can be spaced apart such that a gap, indicated generally at 133 in FIG. 8, can exist between sides 104 and 126.

When the side 126 of the plate 116 is brought into surface-to-surface contact with the side 104, the side 126 overlies or covers the groove 106. As noted above, the cut-out 132 extends radially inwardly, from the peripheral edge of the plate 116, a sufficient distance so that its radially inner end overlies the portion 112 of the groove 106. By rotating the plate 76, with respect to the shaft 36 and thus the plate 116, the point or position where the cut-out overlies the portion 112 can be varied or adjusted.

More particularly, the passage 94, the groove 106 and the cut-out 132 define a flow path for fluid passing from one side of the piston assembly 64 to the other. The length of this flow path, and particularly the length of the flow path defined by the groove 106, can be varied by changing the point or position where the cut-out 132 overlies the portion 112 of the groove 106. By varying the length of this flow path, the time required to pass fluid through that flow path can thus be varied. As more specifically explained hereinbelow, the rate of flow through this flow path controls the rate at which the piston 64, and thus the shaft 36, may be extended out of the body 24. In other words, the variation of the length of the flow path determines the shaft extension speed or velocity, and by varying this flow path length, the speed or velocity can be adjusted accordingly.

In manufacturing the spring 22, the tubular body 24 is turned down on both ends 26 and 28 for crimping. The floating piston 58 is inserted into the fluid chamber 34 and a hydraulic fluid, for example oil, is then injected into the fluid chamber through the end 26 until the chamber is almost fully filled. At this time, the piston 58 is located adjacent the end 28 of the tubular body 24.

The components of the piston assembly 64 are then mounted onto the reduced diameter portion 68 of the shaft 34. More specifically, the top plate 116 is riveted on the end 38 of the shaft, by rivet 118, such that the its side 124 faces the rivet head. The metering plate 76 and annular seal 98 are then inserted onto tile shaft so that the plates' side 104 is adjacent to the side 126 of the plate 116. The washer 72 is next placed on the shaft 36 adjacent to the shoulder 66. The piston 68 assembly and shaft 36 are then inserted into the fluid chamber 34 through the end 26 of the body 22. The end 26 is then crimped and interlocked into the bushing 54. At this point in its manufacture, the spring 22 is partially completed but is uncharged and non-functional.

Next, using a conventional gas charging system, the portion of the fluid chamber 34 between the floating piston 58 and the end 28 of the tubular body 24 (that is, in an end sub-chamber 134, as shown in FIG. 1) is pressurized with a pressurized fluid such as nitrogen. The end cap 44 then driven into the end 28 and the end is crimped into an undercut in the end cap. The spring 22 is now functional and ready for testing and use.

In the resting state of the spring 22, the shaft 36 is fully extended out of the tubular body 24. The nitrogen in the end sub-chamber 134 of the chamber 34 is sealed between the end cap 44 and the piston 58. This gaseous pressure pushes on the piston 58 thereby moving the piston toward the end 26. Such movement of the piston 58, in turn, pressurizes the fluid in the fluid chamber between the end 26 and the piston 58 (that is, in a shaft-side sub-chamber 136 and a middle sub-chamber 138, as shown in FIG. 1). Because the piston assembly 64 does not create a fluid seal between the sub-chambers 136 and 138, the pressure of the fluid therein (that is, on both sides of the assembly 64) is the same. The shaft 36 thus "sees" a differential pressure across the bushing 54, that is, a high pressure fluid on its end 38 and an atmospheric pressure on its end 42. It is this pressure differential which causes the shaft to move to its extended position in its resting state. This is one of the significant, advantageous features of the spring 22. In other words, because the gas pressure acts indirectly on the shaft 36, the spring 22 will function the same way regardless of the shaft's orientation.

Figure 8:
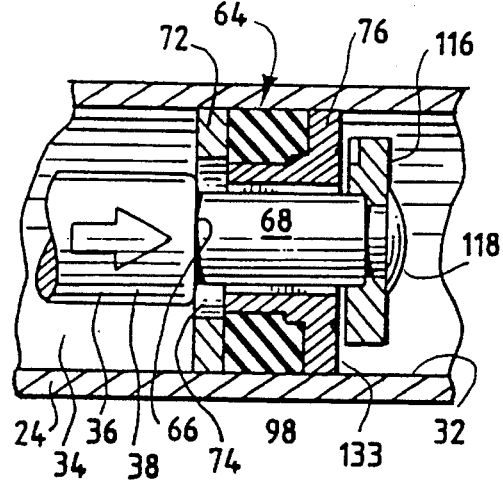
FIG. 8 is a partial, axial, cross-sectional view, similar to FIG. 7 of the first piston assembly with its component being shown in the position in which they are disposed when the shaft is moved in a shaft retracting position.

Referring now to FIG. 8, when a sufficient axial force is applied to the shaft 36, it begins to move inwardly into the chamber 34, that is, in a shaft retracting direction. Because an interference fit exists between the annular seal 98 and the inner wall 32, both the seal and the metering plate 76 momentarily remain stationary during initial inward movement of the shaft, that is, movement of the shaft to the right as shown in FIG. 1. Because it is riveted to the end of the shaft 36, the top plate 116, however, moves instantly with the shaft. Thus there is initial relative movement between the top plate 116 and the metering plate 76, and this relative movement creates a gap, as indicated at 133, between the two facing sides 104 and 126 of these two plates. This gap 133 allows fluid to transfer freely between the middle sub-chamber 136 and the shaft-side sub-chamber 138 through the passages 86–94, which constitutes a flow path, as the shaft continues its movement in a shaft retracting or inward direction.

Because the washer 72 abuts and moves with the shoulder 66, the entire piston assembly 64 begins moving once the side 102 of the metering plate 76 is contacted by the washer. The washer 72 also keeps the annular seal 98 from being forced off the portion 78 of the metering plate 76. Thus, the shaft 36 freely continues moving in the shaft retracting direction.

Figure 7:
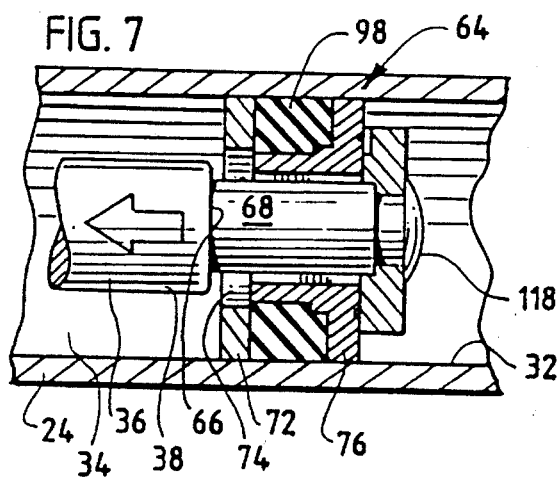
FIG. 7 is a partial, axial, vertical cross-sectional view of the first piston assembly, with its components being shown in the position in which they are disposed when the shaft is moved in a shaft extending direction.

When a sufficient axial force is applied to the shaft in a shaft extension direction (that is, to the left in FIG. 1) as when, for example, the door 56 is opened, the friction of the annular seal 98 against the inner wall 32 of the tubular body 24 causes the metering plate 76 to "shuttle" until the side 126 of the top plate 116 contacts the side 104 of the metering plate 76 as best shown in FIG. 7. Differential fluid pressure across the seal 98 holds the top plate rigid against the metering plate so that sides 104 and 126 are and remain in surface-to-surface contact. As the shaft 36 tries to extend, the passage of fluid within from the shaft-side sub-chamber 138 to the middle sub-chamber 136 is restricted because a gap, such as the gap 133, no longer exists. Accordingly, the only means by which fluid may pass across the piston assembly 64 is through the flow path comprising the passage 94, the G-groove 106 and the cut-out 132.

The alignment of the G-groove 106, and more particularly the portion 112 of this G-groove, with the cut-out 132, determines how fast fluid can meter through this flow path, and consequently how fast the shaft 36 can extend. For instance, if the cut-out 132 is aligned with the G-groove portion 112 adjacent to the juncture between its portions 108 and 112, the length of the flow path through the G-groove 106 will be at its minimum, and the corresponding shaft extension rate or speed will be at its maximum. As the metering plate 76 is rotated relative to the top plate 116, the cut-out 132 is moved relatively around the G-groove portion 112 causing a gradual increase in the flow path's length. By the time that the relative rotation of the top plate and metering plate is almost 360°, the cut-out 132 is aligned with the distal end of the G-groove portion 112, that is, the end of the portion 112 furthest from the junction between the portions 108 and 112. At this point, the length flow path will be at its maximum, and the corresponding shaft extension time will be the slowest. If the plates 76 and 116 are rotated a bit further, relative to one another in the same direction as above, the cut-out 132 will "cross-over" from the distal end of the G-groove to the juncture between the portion 108 and 112, and the shaft extension mime will go from its slowest time back to its fastest time.

Figure 9:
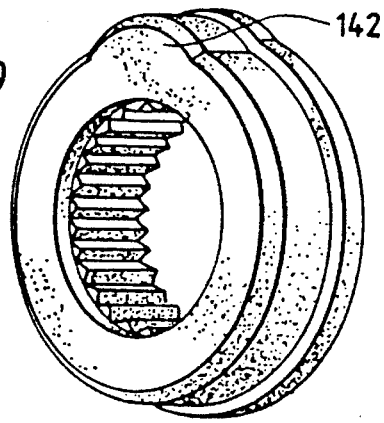
FIG. 9 is a perspective view of a modified metering plate and its associated piston seal.
Figure 10:
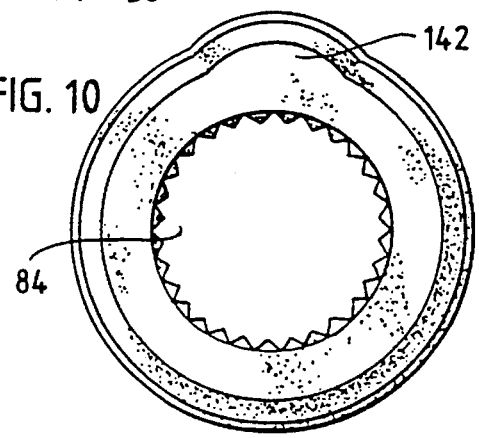
FIG. 10 is a shaft-side end view of the modified metering plate and shaft seal shown in FIG. 9.

To assure that the metering plate 76 can not rotate relative to the body 24, the metering plate 76 and the seal 98 may be modified as best shown in FIGS. 9 and 10. Specifically, a smooth, radially outwardly projecting bump 142 is formed along the peripheral edges of both the larger diameter portion 82 of the metering plate and the radially outer surface of the seal 98. A correspondingly shaped, axially extending bump groove is likewise formed in the inner wall 32 of the tubular body 24. The bump 142 is disposed in and is adapted to slide axially along this corresponding bump groove in the inner wall. The interfitting of the bump 142 and the bump groove assures against relative rotation between the metering plate and the inner wall but does not prevent nor retard axial sliding moving therebetween.

The preferred embodiment of the present invention has now been described. This preferred embodiment constitutes the best mode contemplated by the inventor for carrying out his present invention. The invention and the manner and process of making and using it has been described, it is believed, in such full, clear, concise, and exact terms as to enable a person skilled in this art to make and use the same. Changes can, of course, be made to the preferred embodiment of the invention. For example, G-groove 106 can vary in size, diameter, depth and shape. The piston assembly 64 may consist of more or fewer parts but achieve the same overall function. For example, the metering plate 76 and the piston seal 98 could be incorporated into a single part made of plastic, rubber or the like. Similarly, the front bushing 55 can incorporate a number of different seal types. Further, the top plate 116 may have a counterbore that is formed in its side 126 adjacent to its central axis and that serves to also permit fluid communication between the left ends (as shown in FIGS. 7 and 8) of the channel 86–92 and the radially inner end of the portion 108 of the G-groove 106. Accordingly and because the present invention may be copied without copying the precise details of the preferred embodiment, the following claims particularly point out and distinctly claim the subject matter which the inventor regards as his invention and wishes to protect.

I claim:

1. An adjustable speed gas spring adapted for assisting in closing a door in a building where the gas spring extension velocity determines the closing speed of the door, the gas spring comprising:

a tubular body having an inner wall that defines an elongated fluid chamber therein, the fluid chamber having a first end and a second end and also having an elongated axis that extends between the first and second ends, with the first and second ends of the fluid chamber each having normally closed openings therein, with the fluid chamber being filled with at least a first pressurized fluid, and with the second end of the body adapted to be connected with selectively one of the building adjacent to the door and the door;

a shaft having a central axis and first and second ends, with the first end of the shaft extending into the first end of the fluid chamber so that the axes of the fluid chamber and the shaft are coaxial and so that the first end of the shaft may reciprocally move in the fluid chamber parallel to the axis of the fluid chamber, and with the second end of the shaft adapted to be connected with selectively the other of the door or the building adjacent to the door;

a first piston assembly supported on and about the shaft adjacent the first end of the shaft and serving to separate the fluid chamber into a first sub-chamber that is adjacent the first end of fluid chamber and a second sub-chamber that is adjacent to the second end of the fluid chamber, the first piston assembly including:

(a) a sub-assembly that has a first side facing the first end of the fluid chamber, that has a second side facing the second end of the fluid chamber, that has an axial opening through which the first end of the shaft extends, and that has a portion, between the sides, which sealingly engages the inner wall of the tubular body so as to prevent the flow of fluid between the sub-assembly and the inner wall from the first sub-chamber to the second sub-chamber and visa versa; and (b) a first flow path and a second fluid flow path, with a part of both the first and second flow paths being disposed in the sub-assembly and extending between the first and second sub-chambers, and with the first flow path permitting a larger volume of fluid to pass therethrough, per unit time, than the second flow path; and (c) a first member connected with the first end of the shaft so as to move therewith, with the first member having a first side that faces the first end of the fluid chamber and that is adjacent to the second side of the sub-assembly, with the first member, in cooperation with the sub-assembly, serving to block flow through the first flow path when the first end of the shaft moves relatively away from the second end of the first chamber and to permit flow through the first flow path when the first end of the shaft moves relatively towards the second end of the fluid chamber, with another part of the second flow path being defined between the second side of the sub-assembly and the first side of the first member and with the relative angular positioning of the second side of the sub-assembly and first side of the first member determining the length of the other part of the second flow path.

2. The gas spring of claim 1 wherein a second piston assembly is disposed in and is axially movable within the fluid chamber between the first piston assembly and the second end of the fluid chamber; wherein the second piston assembly serves to define the end of the second sub-chamber, which is between the first and second piston assemblies, and an end sub-chamber, which is between the second piston assembly and the second end of the fluid chamber; wherein the end sub-chamber is filled with a second pressurized fluid that is selectively pressurized to a predetermined pressure; wherein the second piston assembly includes means forming a seal between it and the inner wall of the tubular body for preventing the flow of pressurized fluid therebetween from the second sub-chamber and to the end sub-chamber, and visa versa; and wherein the axial position of the second piston assembly in the fluid chamber is determined by the pressure of the second pressurized fluid and the axial position of the second piston assembly determines the pressure of the pressurized fluid in the first sub-chamber and second sub-chamber portion.

3. The gas spring of claim 2 wherein the second pressurized fluid in the end sub-chamber is a gas; and wherein the first pressurized fluid in the first sub-chamber and the second sub-chamber is a hydraulic fluid.

4. The gas spring of claim 1 wherein a second member is supported on the first end of the shaft adjacent to the first side of the sub-assembly; and wherein the second member limits movement of the sub-assembly, relative to the first end of the shaft, toward the second end of the shaft.

5. The gas spring of claim 4 wherein the first member is attached to and at the first end of the shaft; wherein a shoulder is formed on the shaft adjacent to the first end of the shaft; wherein the second member is disposed on the shaft between the shoulder and the first end of the shaft; wherein the sub-assembly is supported on the shaft between the first and second members; and wherein the distance between first and second members, parallel to the axis of the shaft, is greater than the distance between the first and second sides of the sub-assembly so that the sub-assembly may move, along the axis of the shaft, relative to the first member.

6. The gas spring of claim 1 wherein the shaft and the tubular body may be rotated relative to each about the axis of the shaft; and wherein such relative rotation causes relative rotational movement between the second side of the sub-assembly and the first side of the first member so as to cause the length of the second flow path to be changed.

7. The gas spring of claim 6 which includes means for connecting the sub-assembly with the tubular body so as to prevent relative rotational movement, about the axis of the fluid chamber, between the tubular body and the sub-assembly while permitting relative axial movement between the tubular body and the shaft.

8. The gas spring of claim 1 wherein the second side of the sub-assembly and the first side of the first member are generally parallel to each other and are moved into surface-to-surface contact with each other when the first end of the shaft moves relatively toward the first end of the fluid chamber; wherein the other part of the second flow path includes a curved groove which is formed in selectively one of the second side of the sub-assembly and the first side of the first member and which is spaced inwardly from their peripheral side edges, and a cut-out which is formed adjacent to the peripheral side edges of selectively the other of the first side of the first member and the second side of the sub-assembly and which extends inwardly from the peripheral side edge so as to overlie a portion of the groove.

9. The gas spring of claim 8 wherein the first flow path includes a plurality of axially extending passages in and axially thorough the sub-assembly; wherein the one part of the second flow path includes an axially extending passages; wherein the ends of the axially extending passages, which are adjacent to the second side of the sub-assembly, are blocked by the first side of the first member when the first side of the first member and the second side of the sub-assembly are in surface-to-surface contact; wherein one end of the groove is in fluid communication with the one axially extending passage so as to permit fluid to flow from the one axially extending passage and into the groove when the second side of the sub-assembly and the first side of the first member are in surface to surface contact.

10. The gas spring of claim 1 wherein the first member is a plate which is attached to the first end of the shaft so as to prevent any axial and rotational movement therebetween; wherein the second member is a flow washer that floats on the shaft; wherein the sub-assembly includes an annular piston seal and an annular member that has a first portion which extends along the axis of the shaft and which has a small diameter relative to the diameter of the fluid chamber and a second, larger diameter portion which includes the second side; wherein the piston seal is mounted on the first portion and forms a fluid seal therebetween as well as a fluid seal between the piston seal and the inner wall of the tubular body; and wherein the part of the first and second flow paths include a plurality of axially extending passages defined between the annular member and the shaft.

11. The gas spring of claim 2 wherein a shoulder is formed on the shaft adjacent to the first end of the shaft; wherein a second member is disposed on the shaft between the shoulder and the first end of the shaft; wherein the first member is attached to and at the first end of the shaft; wherein the sub-assembly is supported on the shaft between the first and second members; wherein the second member limits movement of the sub-assembly, relative to the first end of the shaft, toward the second end of the shaft; and wherein the distance between first and second members, parallel to the axis of the shaft, is greater than the distance between the first and second sides of the sub-assembly so that the sub-assembly may move, along the axis of the shaft, relative to the first member.

12. The gas spring of claim 11 wherein the shaft and the tubular body may be rotated relative to each about the axis of the shaft; wherein such relative rotation causes relative rotational movement between the second side of the sub-assembly and the first side of the first member so as to cause the length of the second flow path to be changed.

13. The gas spring of claim 12 wherein the second side of the sub-assembly and the first side of the first member are generally parallel to each other and are moved into surface-to-surface contact with each other when the first end of the shaft moves relatively toward the first end of the fluid chamber; wherein the other part of the second flow path includes a curved groove which is formed in selectively one of the second side of the sub-assembly and the first side of the first member and which is spaced inwardly from their peripheral side edges, and a cut-out which is adjacent to the peripheral side edge of selectively the other of the first side of the first member and the second side of the sub-assembly and which extends inwardly from the peripheral side edge so as to overlie a portion of the groove.

14. The gas spring of claim 13 wherein the first flow path includes a plurality of axially extending passages in and axial through the sub-assembly; wherein the one part of the second flow path includes one of the plurality of the axially extending passages; wherein the ends of the axially extending passages, which are adjacent to the second side of the sub-assembly, are blocked by the first side of the first member when the first side of the first member and the second side of the sub-assembly are in surface-to-surface contact; wherein one end of the groove is in fluid communication with the one axially extending passage so as to permit fluid to flow from the one axially extending passage into the groove when the second side of the sub-assembly and the first side of the first member are in surface to surface contact.

15. The gas spring of claim 14 wherein the second pressurized fluid in the end sub-chamber is a gas; wherein the first pressurized fluid in the first sub-chamber and the second sub-chamber is a hydraulic fluid; wherein the first member is a plate which is attached to the first end of the shaft so as to prevent any axial and rotational movement therebetween; wherein the second member is a washer that floats on the shaft; wherein the sub-assembly includes an annular piston seal and an annular member that has a first portion which extends along the axis of the shaft and which has a small diameter relative to the diameter of the fluid chamber and a second, larger diameter portion which includes the second side; and wherein the piston seal is mounted on the first portion and forms a fluid seal therebetween as well as a fluid seal between the piston seal and the inner wall of the tubular body.

* * * * *